(12) United States Patent
Grewell (10) Patent No.: US 10,442,118 B2
(45) Date of Patent: Oct. 15, 2019

(54) CLOSED LOOP 3D PRINTING

(71) Applicant: Iowa State University Research Foundation, Inc., Ames, IA (US)

(72) Inventor: David Grewell, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 200 days.

(21) Appl. No.: 15/280,639

(22) Filed: Sep. 29, 2016

(65) Prior Publication Data

US 2017/0087767 A1 Mar. 30, 2017

Related U.S. Application Data

(60) Provisional application No. 62/234,394, filed on Sep. 29, 2015.

(51) Int. Cl.
| | |
|---|---|
| *B29C 64/106* | (2017.01) |
| *B29C 35/08* | (2006.01) |
| *B33Y 10/00* | (2015.01) |
| *B33Y 30/00* | (2015.01) |
| *B33Y 50/02* | (2015.01) |
| *B29C 35/02* | (2006.01) |
| *B29C 64/386* | (2017.01) |
| *B29K 105/00* | (2006.01) |

(52) U.S. Cl.
CPC ...... *B29C 35/0805* (2013.01); *B29C 35/0288* (2013.01); *B29C 64/106* (2017.08); *B29C 64/386* (2017.08); *B33Y 10/00* (2014.12); *B33Y 30/00* (2014.12); *B33Y 50/02* (2014.12); *B29C 2035/0822* (2013.01); *B29C 2035/0838* (2013.01); *B29K 2105/0067* (2013.01)

(58) Field of Classification Search
None
See application file for complete search history.

(56) References Cited

U.S. PATENT DOCUMENTS

| | | | | |
|---|---|---|---|---|
| 2013/0273264 A1* | 10/2013 | Mourou | ............... | H05B 6/105 |
| | | | | 427/586 |
| 2014/0044822 A1* | 2/2014 | Mulliken | ........... | H04N 1/00827 |
| | | | | 425/113 |
| 2016/0167309 A1* | 6/2016 | Liu | ........................ | B29C 64/106 |
| | | | | 264/40.1 |

* cited by examiner

*Primary Examiner* — Jacob T Minskey
(74) *Attorney, Agent, or Firm* — McKee, Voorhees & Sease, PLC (57) ABSTRACT

To better control part quality of 3D printed parts, the temperature of an extruder filament using a secondary heat source is provided. A heat source, such as an infrared heat source, can be used to heat the filament of a 3D printer to the optimum temperature that will enhance welding of the filament to a substrate that it is being printed on or to. Such an optimum temperature can be based upon, in part, the temperature of the substrate. A controller or other intelligent control can be used to receive temperature readings of the substrate and/or filament and then can adjust the temperature of the heating source to optimize the temperature of the filament to better combine the filament to the substrate.

10 Claims, 10 Drawing Sheets

$$q_x^{cv} - q_{x+dx}^{cv} + q_x^{cd} - q_{x+dx}^{cd} - q_r^h + Q = pC\frac{d\theta}{dt}$$

CLOSED LOOP 3D PRINTING

CROSS-REFERENCE TO RELATED APPLICATIONS

This application claims priority under 35 U.S.C. § 119 to Provisional Application No. 62/234,394, filed on Sep. 29, 2015, the contents of which are hereby incorporated by reference in their entirety.

FIELD OF THE INVENTION

The disclosure relates generally to the field of 3D printing. More particularly, but not exclusively, the disclosure is directed towards fused deposition modeling, and the use of rapid temperature control to optimize the interfacial heating time and temperature during fusion.

BACKGROUND OF THE INVENTIONS

Figure 1:
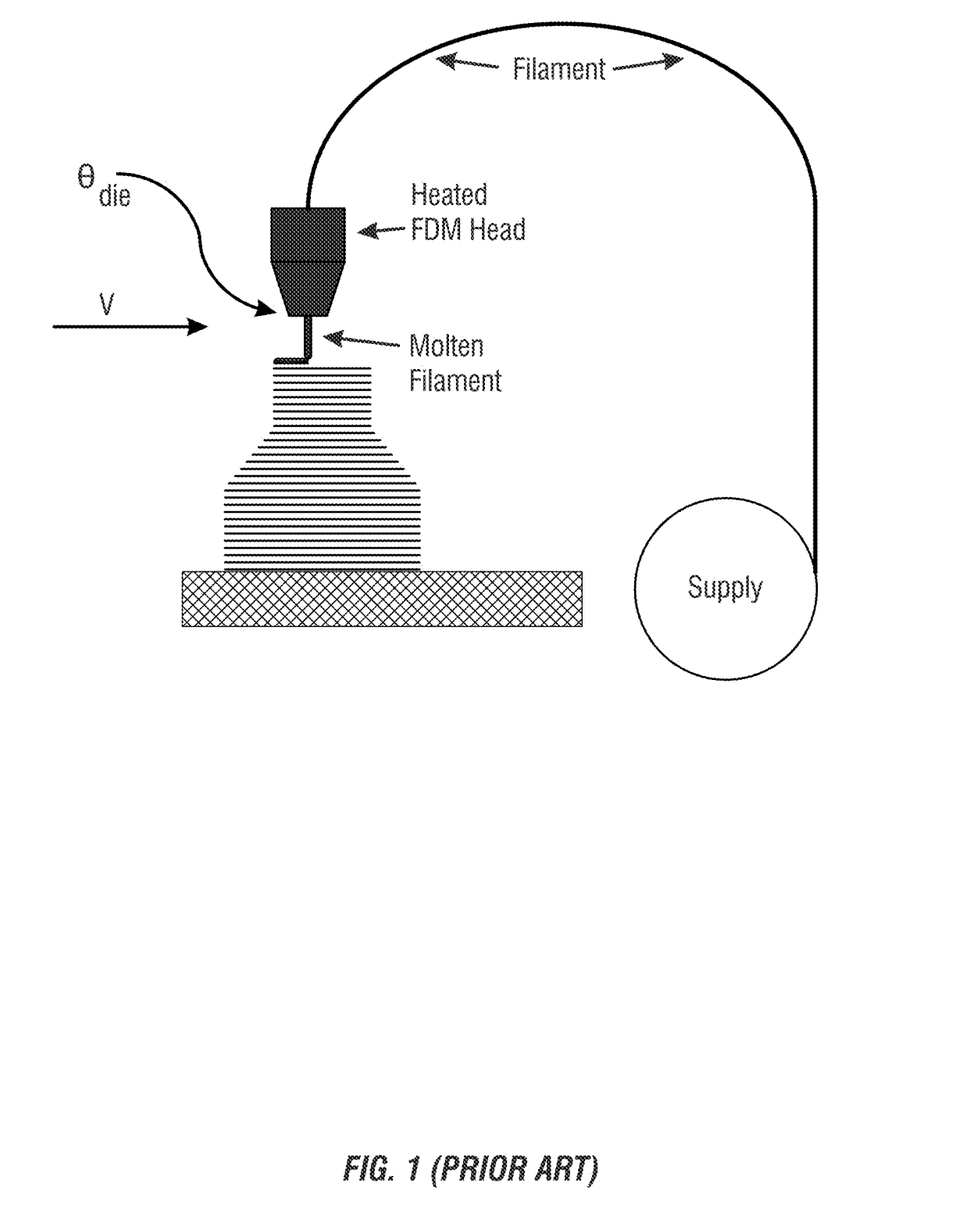
FIG. 1 is a diagram of a prior art 3D printing system.

Currently, 3D printing, and in particular fused deposition modeling (FDM), employ constant extrusion temperature ($\theta_{die}$) and head velocity (V), as shown in FIG. 1. The level of control currently available in FDM is similar to that in other 3D printing techniques, such as laser sintering.

Because the processing parameters remain constant, there is limited control of the interfacial healing. When the filament, which is typically 1-3 mm in diameter, is deposited on the substrate, the temperature of the substrate affects the degree of welding or healing of the interfaces. For example, if the filament (or powder) is deposited onto a substrate that is relatively cold, the temperature of the extruded filament should be relatively high to assure proper welding/healing of the interface. If the filament's temperature is too low, a lack of fusion may result in poor healing and weak parts. In contrast, if the substrate is relatively hot because of the residual heat from the printing process (that is, the printing head recently printed this particular area), the temperature of the extruded filament should be reduced to prevent overheating, which could lead to excessive squeeze flow, lack of dimensional part control, and thermal degradation of the material.

Interfacial healing is the fundamental mechanism that governs additive manufacturing, such as 3D printing. When two surfaces made from the same polymer are brought together in the molten state, the surfaces will conform to each other to achieve intimate contact, and over time intermolecular diffusion and chain entanglement result in fusion bonding or welding of the surfaces to each other. The degree of healing or welding is based on many parameters, including material properties, temperature, interfacial pressure, and time. It has been shown that during healing and welding, five separate phases can be identified, the more critical ones being heating, squeeze flow, and cooling. It has also been proposed and showed that polymer motion can be described by reptilian motion. In general, welding/healing of two polymer interfaces occurs either quickly at a relatively high temperature, or slowly at a relatively low temperature, because interfacial healing is a diffusion process.

Testing has shown that the only process parameter that can effect weld quality (part quality) in 3D printing is extrusion temperature. However, because of thermal inertia of the metal extrusion die, it is not possible to vary the temperature fast enough to allow weld quality to be controlled.

Therefore there is a need in the art to provide an apparatus, system, and/or method for 3D printing that allows for near instantaneous control of the extrusion temperature of a supplied printing material to control the weld quality of the printed component.

BRIEF SUMMARY OF THE INVENTION

Therefore, it is a primary object, feature, and/or advantage of the invention to improve on and/or overcome the deficiencies in the art.

It is another object, feature, and/or advantage of the invention to vary the temperature of an extruder filament of a 3D printing system to control part quality.

It is yet another object, feature, and/or advantage of the invention to heat the filament to a temperature based upon substrate temperature.

It is still another object, feature, and/or advantage of the invention to determine the substrate temperature by model and/or thermal imaging device or system.

It is a further object, feature, and/or advantage of the invention to provide an additional heating element to preheat a substrate to an ideal welding temperature for 3D printing.

It is still a further object, feature, and/or advantage of the invention to provide a method of 3D printing that improves the weld quality of the component printed.

It is yet a further object, feature, and/or advantage of the invention to provide a closed loop 3D printing system that will automatically update the filament temperature based upon the changing environmental conditions.

These and/or other objects, features, and advantages of the invention will be apparent to those skilled in the art. The invention is not to be limited to or by these objects, features and advantages. No single embodiment need provide each and every object, feature, or advantage.

According to some aspects of the invention, an apparatus, system, and/or method for 3D printing is provided that includes an external or secondary heating element to vary the temperature of an extruder filament to an optimum temperature to enhance welding of the filament to a substrate. The apparatus, system, and/or method can be a closed loop system such that the temperature is constantly updated based upon environmental conditions, such as changing substrate temperatures, until the 3D printed component is completed.

According to another aspect of the invention, a closed loop 3D printing system is provided, and includes a 3D printer including an extrusion die having a heating element; a filament provided to the extrusion die for extruding therefrom; a secondary heat source independent of the 3D printer for heating the filament being extruded towards a substrate; said secondary heat source optimized to provide for an ideal temperature of filament being extruded to produce a high quality weld being extruded filament and the substrate.

According to yet another aspect of the invention, a method of 3D printing, is disclosed, and includes, extruding a filament from a die of a 3D printing system at a first temperature; determining the temperature of a substrate to which the filament is to be welded; and adjusting, with a secondary heat source, the temperature of the filament being extruded to a second temperature that will increase the quality of weld between the filament and the substrate.

According to still another aspect of the invention, an apparatus for controlling the temperature of a 3D printing system is disclosed, and includes a controller including a central processing unit and a memory; a heat source independent of the 3D printing system and operatively connected to the controller; and a temperature sensor for sensing a temperature of a substrate being 3D printed on with a filament, said temperature sensor operatively connected to the controller; wherein said controller configured to receive a sensed temperature from the temperature sensor and, based upon said sensed temperature, configured to adjust the heat source to adjust a temperature of the filament before being printed on said substrate.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE INVENTION

The present disclosure is directed towards an apparatus, system, and/or method of 3D printing that provides for greater control in the heat of a filament that is added to a substrate. Controlling the heat of the filament will provide for optimal welding temperature between the filament and the substrate, which will result in a higher quality weld between the elements. As will be understood, the temperature of 3D printing has been shown, through models and testing, to be the biggest factor in achieving such a high quality weld. As previously disclosed, welding/healing of two polymer interfaces occurs either quickly at a relatively high temperature, or slowly at a relatively low temperature, because interfacial healing is a diffusion process. By using Einstein's diffusion equation, where D is the diffusion coefficient, it is possible to show that healing is related to time to a power of ¼, such that $X \sim t^{1/4}$. If it is assumed that intermolecular diffusion and healing are proportional to each other, then it can be further determined that healing is proportional to time to a ¼ power. In addition, it has been proposed that the diffusion coefficient is an Arrhenius function of temperature (T) and it can be expressed as follows:

$$D(t)=D_0 e^{-E_a/kT}$$

where $D_0$ is the diffusion constant, $E_a$ is the activation energy, and k is the Boltzmann constant ($1.3807 \times 10^{23}$ J/K).

Following the approach by Bastien and Gillespie, the degree of healing or welding (DW) for isothermal conditions can be determined using the following relation:

$$DW(t)=DW_0+\Gamma e^{-E_a/kT_f} t^{1/4}$$

In this case, $DW_0$ is the initial degree of healing and $\Gamma$ is the combined squeeze flow and healing coefficient.

Figure 2:
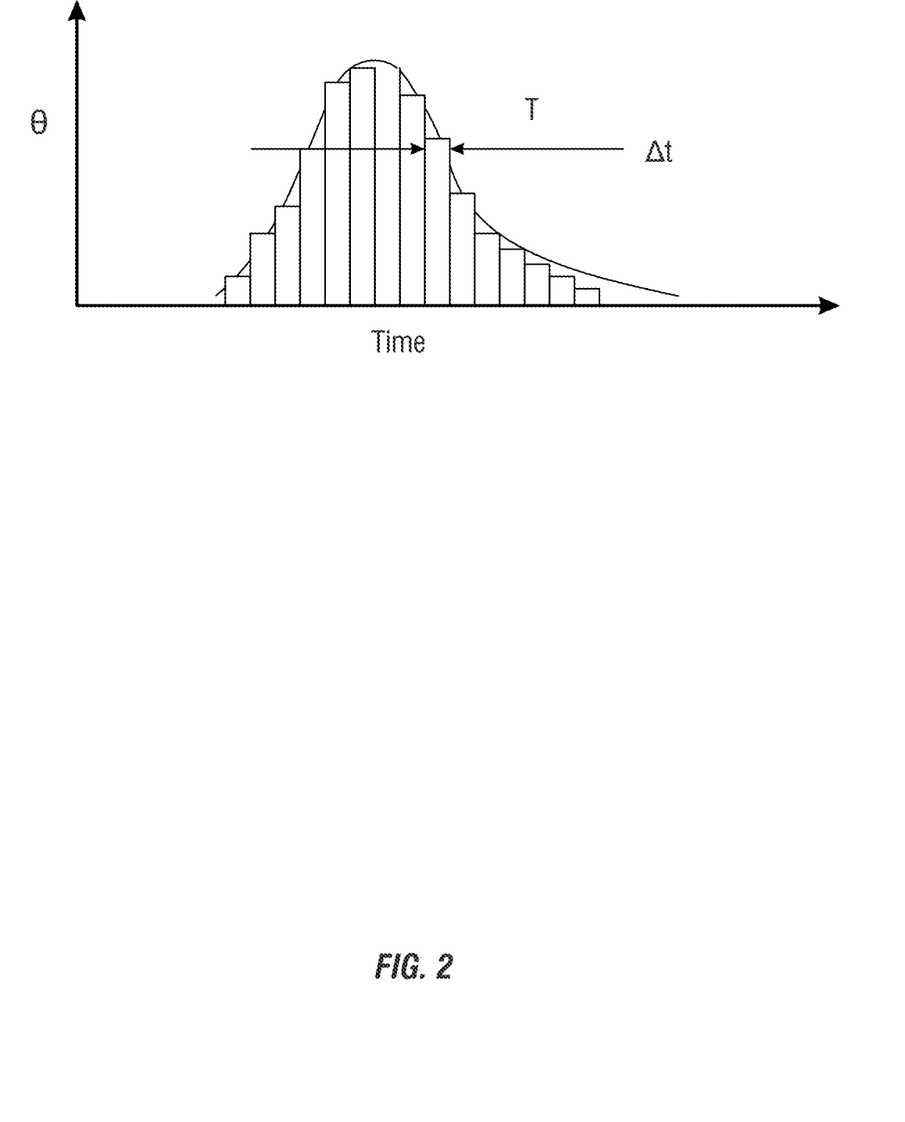
FIG. 2 is a graph showing temperature profiles showing die temperature over time and broken into time increments.

For temperature profiles that are not constant, it is possible to segment a complex temperature history into small time increments and add the degree of welding for each increment to determine the effective degree of welding for the complex temperature history, as shown in FIG. 2.

Thus, it is possible to predict the DW for varying times (t) and temperature (7) as:

$$DW(T,t)_h = \sum_{t=0}^{t=t'} K_0 \cdot e^{-\frac{E_a(T)}{kT}} \cdot \Delta t^{1/4}$$

Figure 3:
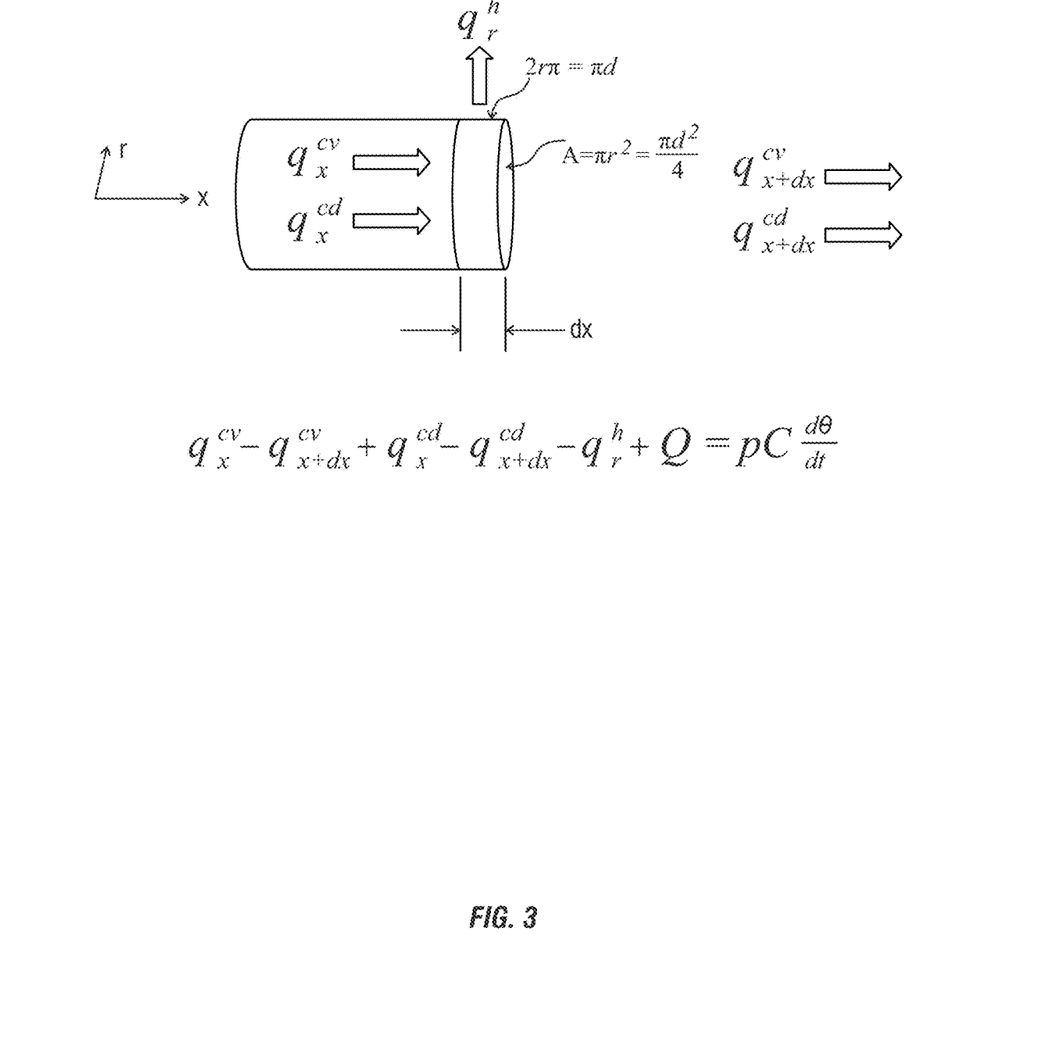
FIG. 3 is a model of an extrusion process.

In order to predict the temperature during FDM, it is possible to model the process with an extrusion model as shown in FIG. 3.

In the model shown in FIG. 3, $q_x$ are convection terms, $q_r$ is heat loss through convection (air), V is the velocity of the extrusion process, and $\theta_{die}$ and $\theta_{air}$ are the temperature of the die and air, respectively. In addition, h is the coefficient of convection, and d is the diameter of the extrusion.

By making several assumptions, it is possible to develop a time varying temperature history as (knowing that x=V*t):

$$\theta'(x) = \theta_d \exp\left(\frac{\frac{V}{\kappa} - \sqrt{\left(\frac{V}{\kappa}\right)^2 + 4\left(\frac{4h}{d\lambda}\right)}}{2}\right) x$$

In this case, $\kappa$ is thermal diffusivity and $\lambda$ is the thermal conductivity of the plastic.

Experimental Results

Figure 4:
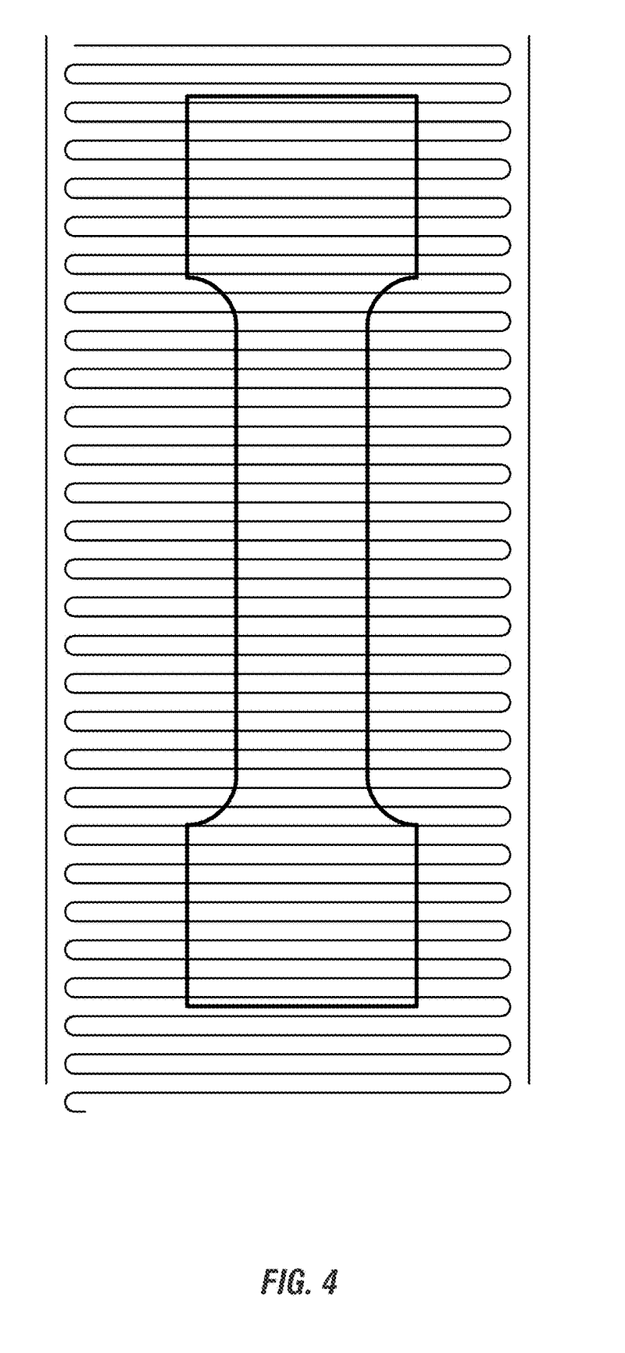
FIG. 4 is a view of a 3D printed part and sample cut from printed sample for testing.

In order to confirm the models, experiments were conducted in which 3D printed parts were produced at varying temperatures and velocities, and the strength of the parts was measured using a samples such as the one shown in FIG. 4.

Figure 5:
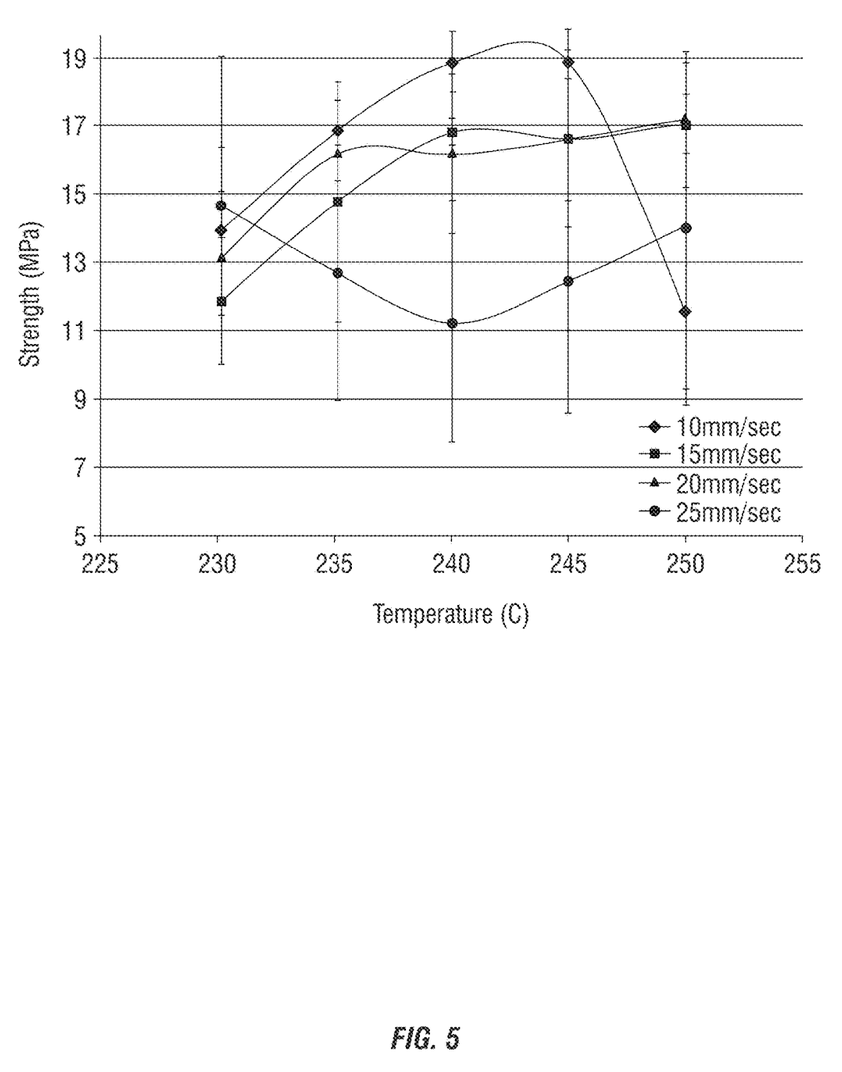
FIG. 5 is a graph showing weld strength as a function of temperature for various printing velocities (ABS).

As shown in FIG. 5, generally sample strength (weld strength) is proportional to die temperature until an optimized temperature is used beyond which weld strength is reduced. This is consistent with theories of squeeze flow, thermal degradation, and molecular diffusion.

Figure 6:
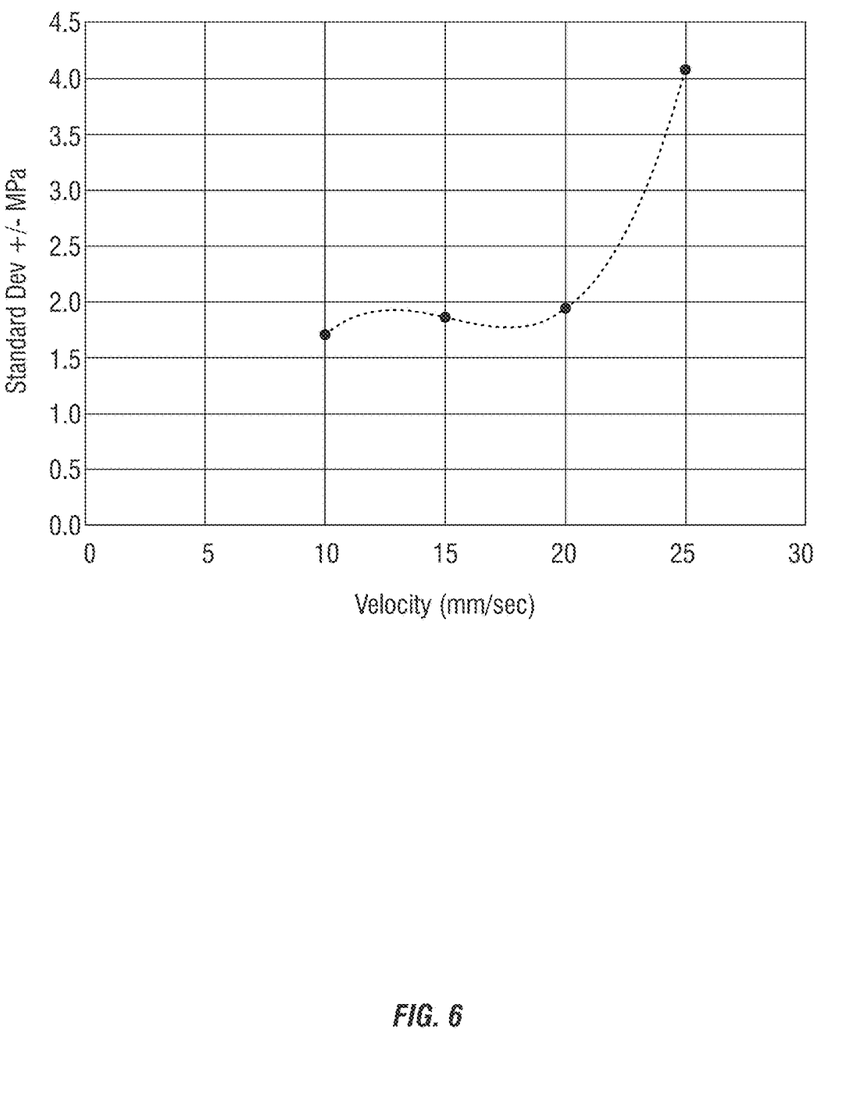
FIG. 6 is a graph showing weld strength standard deviation error (population of six) as a function of printing velocity.

It is shown in FIG. 5 that velocity has little effect on weld strength; however, as shown in FIG. 6, the standard deviation of weld quality is generally proportional to velocity, indicating that excessively high printing speed (extrusion head speed) promotes inconsistent weld strength. This is most likely the result of inertial effects of the printing head.

Figure 7:
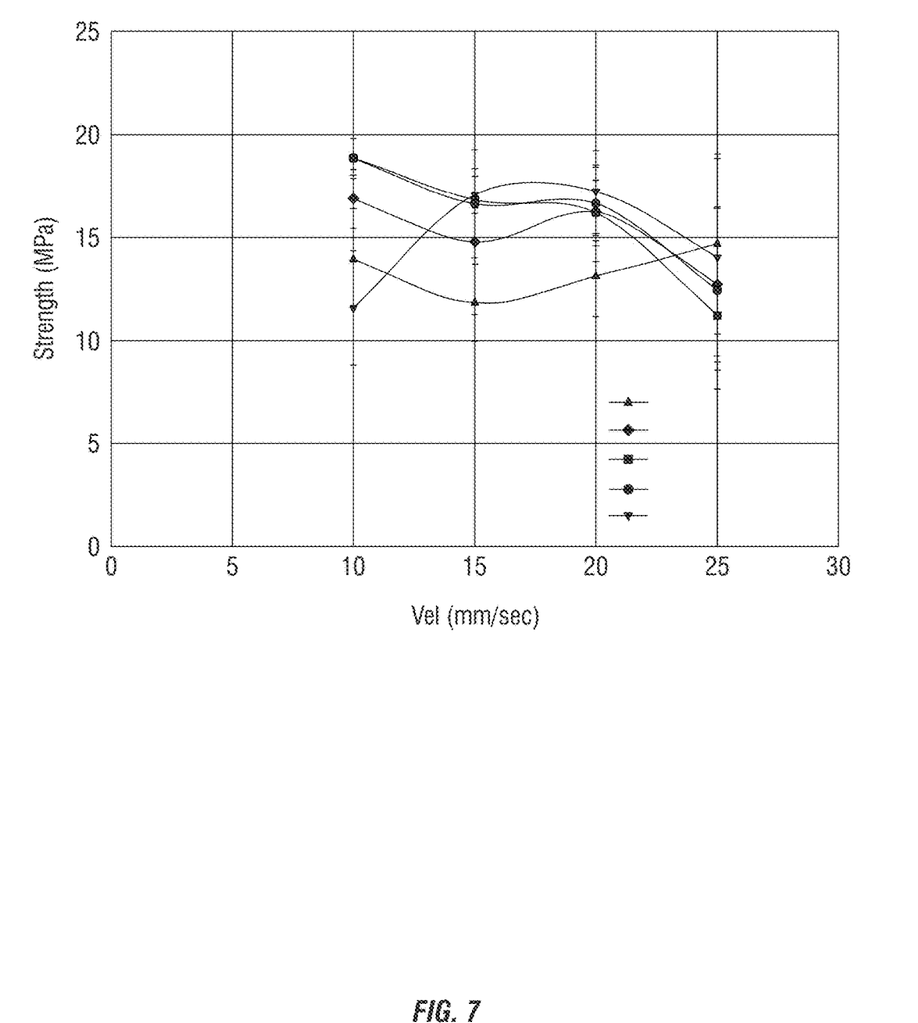
FIG. 7 is a graph showing weld strength as a function of print velocity at various temperatures (ABS plastic).
Figure 8:
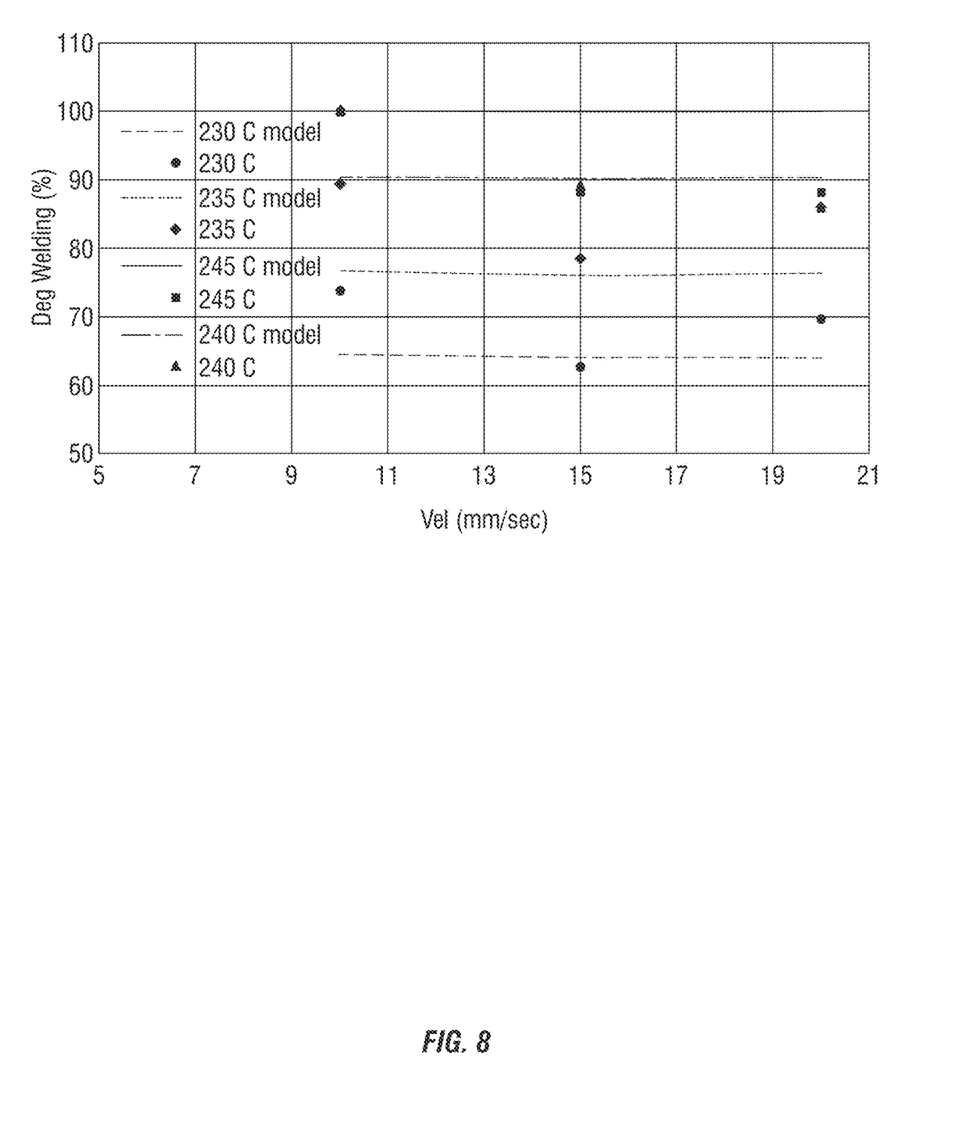
FIG. 8 is a graph showing weld strength as a function of print velocity at various temperatures (ABS) experimental (dots) and model (line).

FIG. 7 shows weld strength as a function of printing velocity and it is understood that generally weld quality is independent of printing velocity. This is further shown in FIG. 8, where the model shows a similar trend, namely that part quality (weld strength) is independent of printing velocity over the temperature range studied. This is because the scale of the velocity is much larger (5-20 mm/s) than the diameter of the extruded filament (approximately 0.05 mm), and at these velocities, the heat source (the die) effectively is only at the printing location for a very short period of time.

Figure 9:
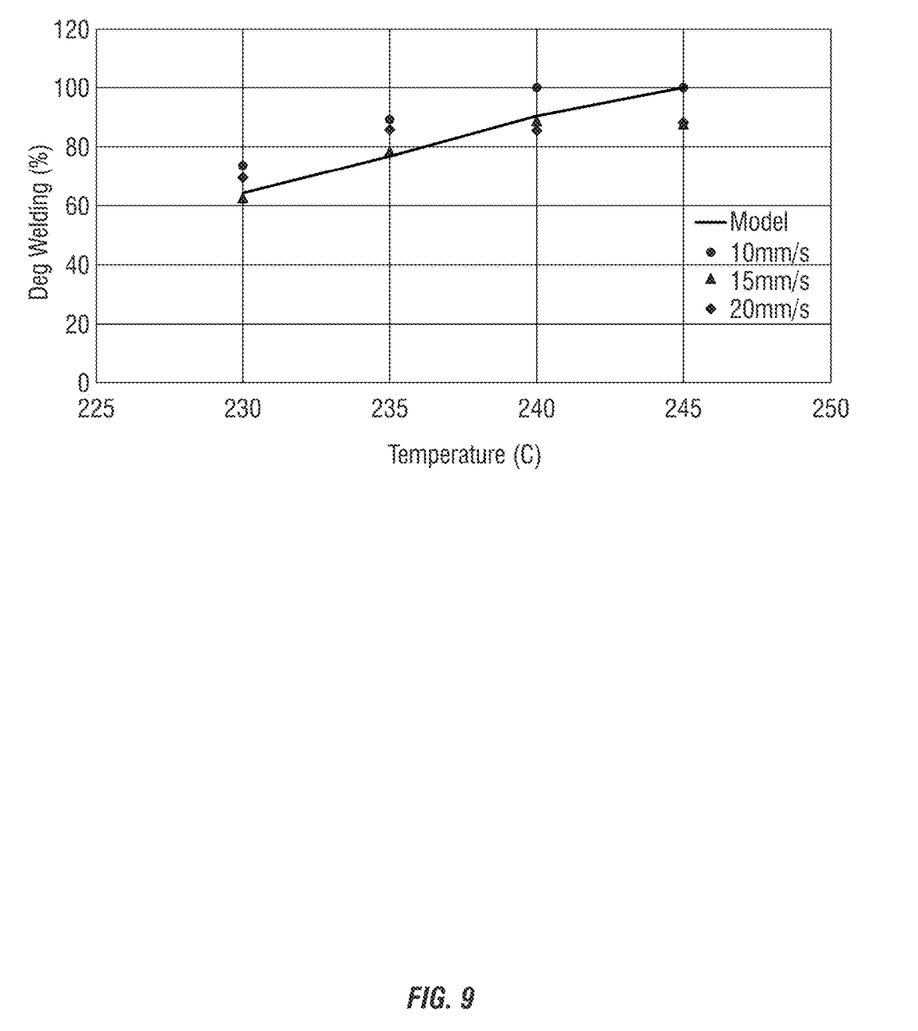
FIG. 9 is a graph showing weld strength as a function of temperature for various printing velocity (ABS) experimental (dots) and model (line).

FIG. 9 shows that the model is in good agreement with the experimental data, predicting that weld strength (part quality) is generally proportional to printing temperature. Thus, it is seen the only effective parameter that can effect/control part quality is temperature of the extrudate.

Therefore, knowing that only process parameter that can affect weld quality (part quality) in 3D printing is extrusion temperature, it is a goal of the disclosure to provide an apparatus, system, and/or method to vary the temperature fast enough to allow weld quality to be controlled, regardless of the thermal inertia of the metal extrusion die.

In order to control part quality of 3D printed parts, the disclosure provides for an apparatus, system, and/or method to vary the temperature of the extruder filament by using a secondary heat source. For example, while the temperature of the die is set to a relatively low point, an infrared heating source is used to heat the filament to the optimum temperature to enhance welding of the filament to substrate. The "ideal" temperature of the filament is based on the temperature of the substrate. This substrate may be a virgin print surface or a previously printed layer. The temperatures of these two surfaces will vary greatly. Although the model may be used to predict the temperature of the substrate, a more accurate method is the use of an infrared thermal imaging system. The interfacial temperature can be calculated as the average of the extrusion and the substrate temperatures.

Figure 10:
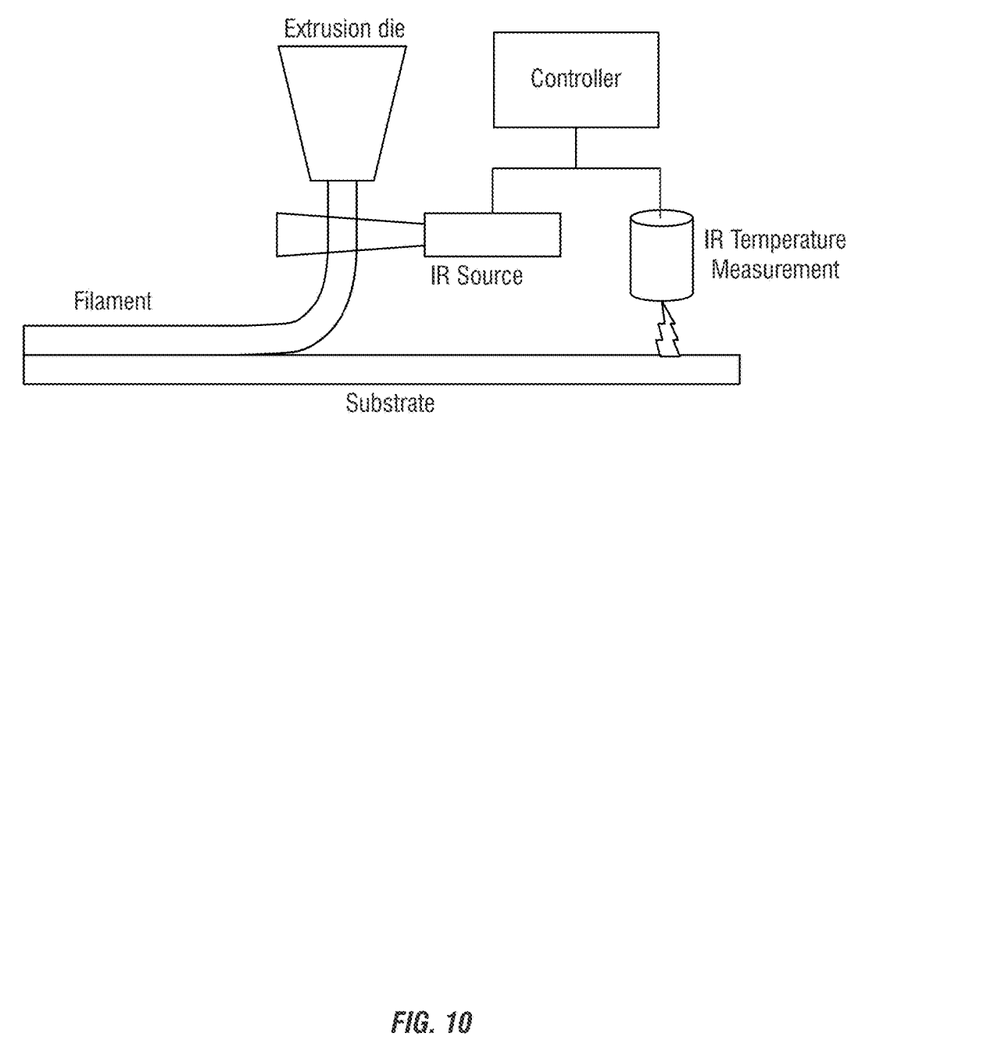
FIG. 10 is a diagram of a closed loop 3D printing system according to aspects of the invention.

A diagram showing aspects of the disclosure is shown in FIG. 10. In the figure, the IR source is a laser diode that has a wavelength of approximately 900 nm. The wavelength of the laser diode could be altered to provide the temperature control of the filament, and should be considered to be in the general range of 380-1,650 nm. This will allow for subsurface/bulk heating of the filament, which eliminates issues related to the plastic's low thermal conductivity that can limit the heating rate of the filament. In addition, a laser diode allows for a focused heating range, important for the relatively small filaments (50-100 microns). Also, the power level of a laser diode can be varied quickly, which is critical for 3D printing.

The controller interprets the temperature of the substrate, then modulates the power of the laser to vary the temperature of the filament being deposited. In addition, it is possible to have a second laser (highly focused) to preheat the substrate to further enhance weld (part) quality.

As noted, the level of control currently available in FDM is similar to that in other 3D printing techniques, such as laser sintering, and thus the concept of closed loop control detailed here is applicable to other methods.

Furthermore, it is contemplated that any system can be considered a closed loop system. A hybrid laser system could be used to heat the faying surfaces fast enough to allow a closed loop system to be realized. This would take into account the ever-changing substrate and any other environmental temperature change to update the heating laser that is acting upon the extruding die to provide for an ideal or optimized filament temperature for welding to the substrate. The temperature would be based on thermal history, which is the temperature of the virgin or previously printed layer of substrate.

While the laser as shown in the Figures is shown to be a laser diode, it should be appreciated that generally any type of laser be utilized. For example, it is contemplated that fiber lasers, gas lasers, solid state laser, or generally any other type of laser be utilized as the heating element to quickly and accurately control the heating of the filament.

Therefore, a closed loop 3D printing system and method for controlling the same has been provided. It is to be appreciated that any number of changes be contemplated by the disclosure, and that the disclosure need not be limited to the exemplary aspects disclosed herein.

What is claimed is:

1. A closed loop 3D printing system, comprising:
   a 3D printer including an extrusion die having a heating element;
   a filament provided to the extrusion die for extruding therefrom;
   a secondary heat source independent of the 3D printer for heating the filament being extruded towards a substrate, wherein said secondary heat source is positioned to heat the filament after being extruded by the extrusion die and before contacting the substrate;
   said secondary heat source optimized to provide for an ideal temperature of filament being extruded to produce a high quality weld between the extruded filament and the substrate.

2. The system of claim 1, further comprising a temperature sensor for detecting a temperature of the substrate.

3. The system of claim 2, wherein a power of the secondary heat source is determined based upon the detected temperature of the substrate to change the temperature of the filament being extruded.

4. The system of claim 3, further comprising an intelligent control operatively connected to the secondary heat source and the temperature sensor.

5. The system of claim 4, wherein the intelligent control receives the detected temperature from the temperature sensor and to adjust the power of the secondary heat source.

6. The system of claim 5, further comprising a tertiary heat source operatively connected to the intelligent control.

7. The system of claim 6, wherein the tertiary heat source is directed towards the substrate to set a temperature for the substrate.

8. The system of claim 2, wherein the secondary heat source comprises an infrared heating source.

9. The system of claim 8, wherein the infrared heating source is a laser.

10. The system of claim 2, wherein the temperature sensor comprises an infrared thermal imaging system.

* * * * *